United States Patent
Popper

(10) Patent No.: US 7,529,326 B2
(45) Date of Patent: *May 5, 2009

(54) PRECISE FREQUENCY ESTIMATION OF SHORT DATA BURSTS

(75) Inventor: Ambroise Popper, Paris (FR)

(73) Assignee: Juniper Networks, Inc., Sunnyvale, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 11/626,685

(22) Filed: Jan. 24, 2007

(65) Prior Publication Data

US 2007/0116159 A1      May 24, 2007

Related U.S. Application Data

(63) Continuation of application No. 09/974,332, filed on Oct. 10, 2001, now Pat. No. 7,187,731.

(30) Foreign Application Priority Data

Feb. 26, 2001   (EP)  .................................. 01400495

(51) Int. Cl.
    H04L 27/06 (2006.01)
    H04B 3/00 (2006.01)
(52) U.S. Cl. ...................... 375/344; 375/257; 375/222
(58) Field of Classification Search ................ 375/344, 375/222, 257, 375
    See application file for complete search history.

(56) References Cited

U.S. PATENT DOCUMENTS

| 5,867,539 A | 2/1999 | Koslov |
| 6,052,419 A | 4/2000 | Hioki |

FOREIGN PATENT DOCUMENTS

| EP | 0 681 386 A | 11/1995 |
| EP | 0 692 896 A | 1/1996 |
| EP | 0 719 002 A | 6/1996 |

OTHER PUBLICATIONS

A. Popper, co-pending U.S. Appl. No 09/974,332, filed Oct. 10, 2001, Precise Frequency Estimation of Short Data Bursts.

*Primary Examiner*—Kevin Y Kim
(74) *Attorney, Agent, or Firm*—Harrity & Harrity, LLP

(57) ABSTRACT

The invention performs frequency estimation over both the burst preamble, during which known symbols are transmitted, and also during the burst's data packet, which is subsequent to the preamble and extracted by the local detector. During the preamble, an initial frequency estimate is obtained. This estimate is based on a time average of either phase or correlation samples. Atypical phase or correlation samples, attributable to detector symbol errors during the data packet, are detected and filtered, so as to avoid including the atypical samples in a time-averages used to provide the frequency estimate. In a first embodiment correlation samples are time averaged, and atypical correlation samples are suppressed prior to correlation time averaging. In a second embodiment, phase slope values are time averaged, and atypical values of phase slope are suppressed prior to phase slope time averaging.

19 Claims, 9 Drawing Sheets

PRECISE FREQUENCY ESTIMATION OF SHORT DATA BURSTS

CROSS REFERENCE TO RELATED APPLICATIONS

This application is a continuation of U.S. patent application Ser. No. 09/974,332 filed on Oct. 10, 2001, now U.S. Pat. No. 7,187,731, which claims priority under 35 U.S.C. 119 based on European Patent Application No. 01400495.6 filed Feb. 26, 2001, both of which are incorporated by reference herein.

BACKGROUND

FIGS. 1A and 1B illustrate a prior-art Hybrid Fiber-Coax (RFC) cable system 100 that is compatible with the cable industry standard Data over Cable System Interface Specification (DOCSIS) for providing Internet access to cable customers via so called Cable Modems (CMs). FIG. 1A is a top-level view of the cable system. FIG. 1B provides additional detail of the Customer Premises Equipment (CPE) of FIG. 1A. In FIG. 1B, CM 4000 provides a computer industry standard Ethernet interface to PC 5000 and bridges the Ethernet interface with the coax distribution of the cable system. CM 4000 internally implements both an RF Modulator and an RF Demodulator for communications over the coax in accordance with the DOCSIS standard.

An RF Modulator 3000 and RF Demodulator 1000, complementary to those of the cable modem, are implemented in a DOCSIS compatible Cable Modem Termination System (CMTS) 500, which as the name implies, provides termination for the Cable Modem of the CPE. Multiple instances of Modulator 3000 and Demodulator 1000 are provisioned to support all customers with CM service. Control, MAC, Framing 2000 bridges all of the provisioned DOCSIS RF interfaces with one or more packet-based networks. These packet networks may include local area networks, intranets, and the Internet. While FIG. 1A shows the CMTS 500 implemented in a Head End or Primary Hub, theoretically it is possible to implement the CMTS anywhere upstream from the CM. Each demodulator 1000 provides outputs to the Control, MAC, Framing 2000 that include Detected Symbols 1200 and a Frequency Offset Estimate 1300.

While the transmitter of the CM upstream modulator and the complementary receiver in the CMTS demodulator are theoretically provisioned for identical frequencies, frequency offsets may occur for a variety of reasons. These reasons include errors in the local oscillators of the CM modulator (used to transmit the signal burst at the provisioned frequency) or CMTS front-end (used to down-convert the received signal burst to baseband) as well as the use of up- and downconversion processes applied to the upstream channels over the path from CM to CMTS. These conversion processes are used to combine and split multiple channels over common communication paths for economic transport. Depending on severity and other system issues, frequency offsets could degrade Bit Error Rates (BERs), increase latencies, or completely prevent signal capture. However, these problems may be avoided by using closed loop methods to minimize or eliminate the offsets.

In CMTS applications, system operation may be conceptually divided into normal data traffic conditions (traffic mode) and so-called ranging periods (ranging mode). Ranging is a closed loop process by which the CMTS manages the timing, power level, offset frequency, and equalization for the transmitter of each CM. Ranging is performed whenever a CM is initialized and registered by the network and also periodically (at regular time intervals) to update its calibration. The ranging calibration process is performed for every CM on the channel and enables the system to smoothly operate at high effective throughput during traffic mode.

As applicable to the cable system of FIG. 1A, during ranging, a Frequency Offset Estimate 1300 is made in Demodulator 1000 of the CMTS and provided to the Control, MAC, and Framing 2000. The control functions of this block then send one or more commands downstream to the corresponding CM, remotely adjusting its transmitter frequency until the frequency offset observed at Demodulator 1000 is reduced to within predefined acceptable limits. Once set during ranging, the offset frequency adjust continues to be used by the CM during subsequent traffic mode operation. The ranging determined offset frequency adjust thus effectively eliminates any frequency offset observed by the CMTS, regardless of the source or sources of the offset.

Ranging represents the most problematic operating condition for determining the frequency offset estimate, as the frequency offset is generally large during ranging and other CM characteristics are not yet calibrated for optimal performance. Accordingly, symbol errors may be frequent. During traffic mode, the CM is operating with a much smaller effective frequency offset due to the compensating offset frequency adjust assigned by the CMTS during ranging and overall CM operation is optimally calibrated. Symbol errors are significantly reduced.

Demodulator Operation

FIG. 2A provides a general conceptual block diagram of the digital burst Demodulator 1000 in the CMTS 500. Front-End 600 isolates one modulated carrier from the carrier multiplex in the Received Spectrum 1100, baseband converts the signal, and passes the resulting signal 1105 to the Burst and Timing Synchronization circuit 1500. (In other contexts the Front-End 600 might be considered as a function prior to, and not part of, the demodulator.) The Recovered Signal Samples 1106, at the output of circuit 1500, are discrete signal samples at the symbol rate.

Equalizer 1600 compensates for signal distortion not compensated by a pre-equalizer in the cable modem (CM) and also suppresses ingress noise. At the output of this stage, the Equalized Signal Samples $r_k$ (1107) are given by:

$$r_k = a_k e^{j\phi_k} + w_k,$$

where $a_k$ is the transmitted symbol and $W_k$ is the additive noise. These samples are not yet synchronized in terms of carrier phase.

Carrier Phase Synchronized Samples 1108 are produced by the Rotator 1700 in conjunctions with Phase Estimator 1900. The carrier phase $\phi_k$ is given by.

$$\phi_k = 2k\pi\Delta f T_s + \phi_0.$$

where $\Delta f$ is the frequency offset and $T_s$ is the symbol period.

Let $\hat\phi_k$ be the estimated carrier phase used for symbol k. The equalized signal $r_k$ is multiplied by $\exp[-j\hat\phi_k]$ within Rotator 1700 so as to decide symbol $a_k$ by Detector 1800. The decision on symbol $a_k$ is denoted $d_k$, which is output as Detected Symbols 1200.

The quantity $p_k = r_k d_k^*$ is subsequently computed. For CMTS and other applications having a high value of the frequency drift, quasi-differential demodulation is preferred, and the carrier phase recovery algorithm only uses the last value Of $p_k$ to determine the carrier phase. In such cases, the estimated carrier phase can thus be written as:

$$\hat\phi_k = \arg(r_{k-1} d_{k-1}^*)$$

Prior Art Frequency Estimators

Frequency Offset Estimator 8000 provides Frequency Offset Estimate 1300, an estimate of the observed frequency offset of the received signal. Prior art frequency estimation techniques for general burst demodulator applications have used phase slope computations and related time averaging, or have been based on the autocorrelation function of the signal. FIG. 2B illustrates a particular prior art Frequency Offset Estimator (8000-PA-AC) based on autocorrelation of the signal. FIG. 2C illustrates a particular prior art Frequency Offset Estimator (8000-PA-PS) based on phase slope computations. FIG. 2D provides additional detail of the Phase Slope Computation 8100, of FIG. 2C.

The prior art frequency estimation techniques provide satisfactory precision for more general burst demodulator applications that use long bursts of known symbols (such as found in long message preambles) or admit to time averaging over multiple consecutive bursts. Unfortunately, both isolated short bursts and symbol errors are characteristics of CMTS applications, particularly during ranging. CMTS applications employ isolated short ranging bursts of approximately 200 symbols, consisting of a very short preamble (typically 20-30 known symbols) and a short data block consisting of symbols extracted by the local detector. Due to noise and other factors, generally including the existence of frequency offsets, the output of the detector will not be free of symbol errors.

In view of the above, it is useful to make a detailed examination of the performance of the prior art frequency estimator based on the autocorrelation function of the signal. As shown in FIG. 2B, the prior art autocorrelation estimator bases the frequency estimation on the computation of $\delta_k = p_k p_{k-L}^*$. By proper normalization of the time average of $\delta_k$, the frequency can be estimated as:

$$\hat{\Delta f} = \frac{\arg\left(\sum_{k=L+1}^{N} \delta_k\right)}{2\pi T_s L}$$

where N designates the number of symbols in the burst at hand, and L is a delay parameter defined in the Correlator 8620 in FIG. 2B.

Suppose that a symbol error occurs at the $k_0$ decision instant. With the assumed QPSK signal format, this leads to an instantaneous phase error of $\pm\pi/2$. Furthermore, as quasi-differential demodulation is used, this $\pm\pi/2$ phase-error appears in all subsequent symbol decisions, and also in all $p_k$ values computed after $k_0$.

Thus, the phase of $p_k$ for the theoretical frequency estimator has a constant slope except for one discontinuity of $\pm\pi/2$ when the error occurs. Consequently, the phase of $\delta_k$ (recall that $\delta_k = p_k p_{k-L}^*$) is centered around the desired value, except for L values with an error of $\pm\pi/2$. The average phase of $\delta_k$ over the burst size is then shifted by $\pm L(\pi/2)/(N-L)$. Since the normalized frequency estimate $\Delta f T_s$ is obtained by dividing this average phase by $2\pi L$, it clearly contains an error of $\pm 0.25/(N-L)$.

Consider a particular quantitative example using the foregoing analysis Suppose that we want to have an estimation precision of $10_{-4}$ for a burst length of 200. Should a single decision error occur during this burst, this error would result in a normalized frequency estimation error of approximately 0.25/200, or approximately $10^{-3}$. This is an order of magnitude greater than the desired accuracy of $10^{-4}$. Those skilled in the art will see that a similar analysis, with similar results, can be made for a phase slope based estimator.

The prior art frequency estimation approaches are clearly not well suited to CMTS applications, as it has been seen that even a single symbol error results in substantial errors. Improved frequency estimation methods and devices are needed that provide precise frequency estimates for short bursts in the presence of symbol errors. New frequency estimation approaches are needed that can be performed on one single burst, without the need for averaging the results of several consecutive bursts. In particular, improved frequency estimation techniques are needed that offer superior performance for CMTS applications.

BRIEF DESCRIPTION OF DRAWINGS

FIG. 1A is a top-level view of the cable system. FIG. 1B provides additional detail of the CPE of FIG. 1A.

SUMMARY

The present invention provides methods and apparatus for generating precise frequency estimates for applications with both short bursts and symbol errors. The invention is practical, easy to implement, robust against decision errors, and requires only one burst to achieve frequency estimation with high precision (around $10^{-4}$ in $\Delta f T_s$ in the illustrative embodiments).

The invention performs frequency estimation over both the burst preamble, during which known symbols are transmitted, and also during the burst's data packet, which is subsequent to the preamble and extracted by the local detector. During the preamble, an initial frequency estimate is obtained. This estimate is based on a time average of either phase or correlation samples. Atypical phase or correlation samples, attributable to detector symbol errors during the data packet, are detected and filtered, so as to avoid including the atypical samples in a time-average used to provide the frequency estimate.

In a first embodiment correlation samples are time averaged, and atypical correlation samples are suppressed prior to correlation time averaging. In a second embodiment, phase slope values are time averaged, and atypical values of phase slope are suppressed prior to phase slope time averaging.

DETAILED DESCRIPTION

Atypical Sample Suppression

Figure 2A:
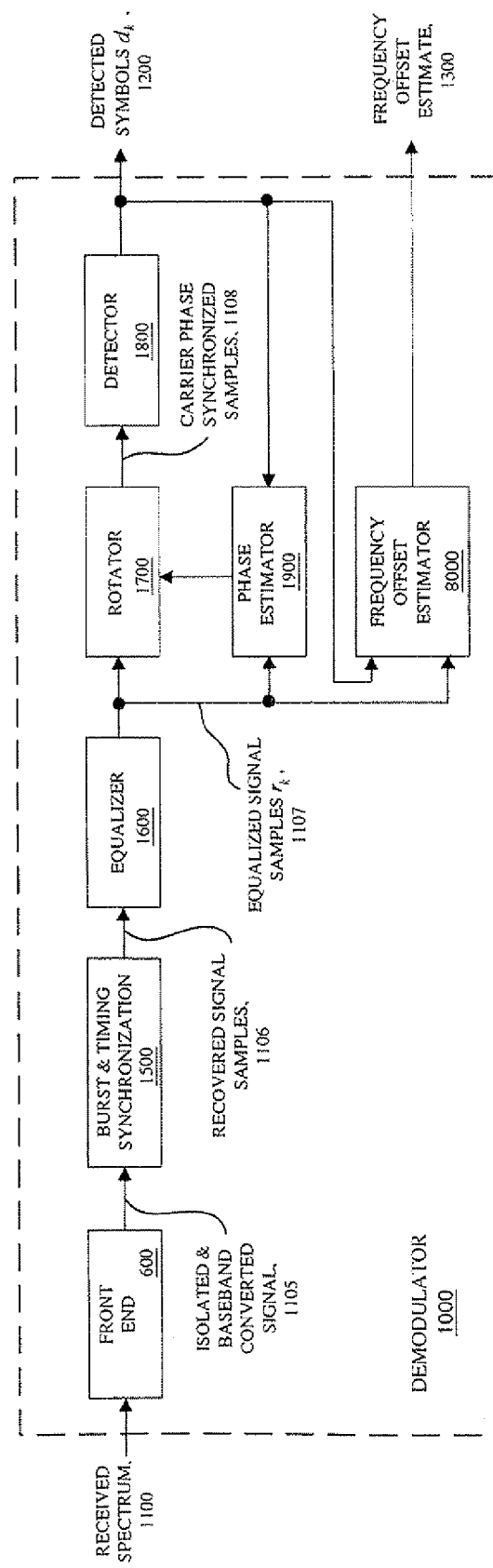
FIG. 2A provides internal architectural detail of Demodulator 1000 of FIG. 1A.
Figure 2B:
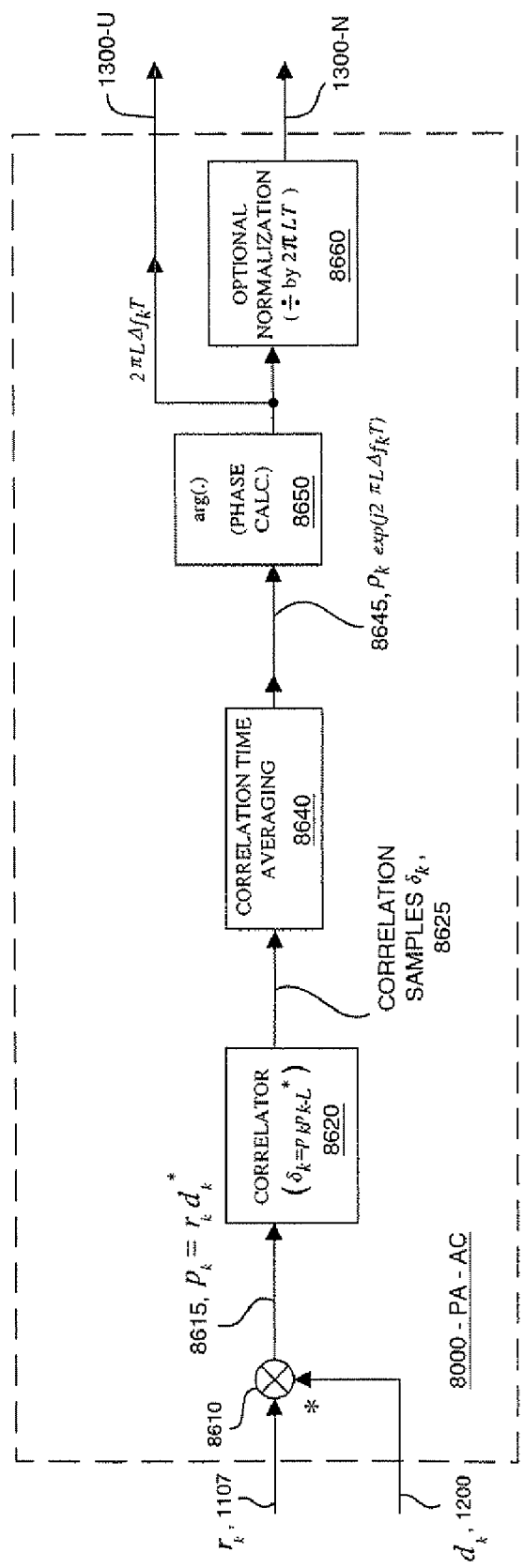
FIG. 2B provides detail of a prior art Frequency Offset Estimator 8000-PA-AC, based on Autocorrelation of the signal, and having application in the Demodulator 1000 of FIG. 2A.
Figure 2C:
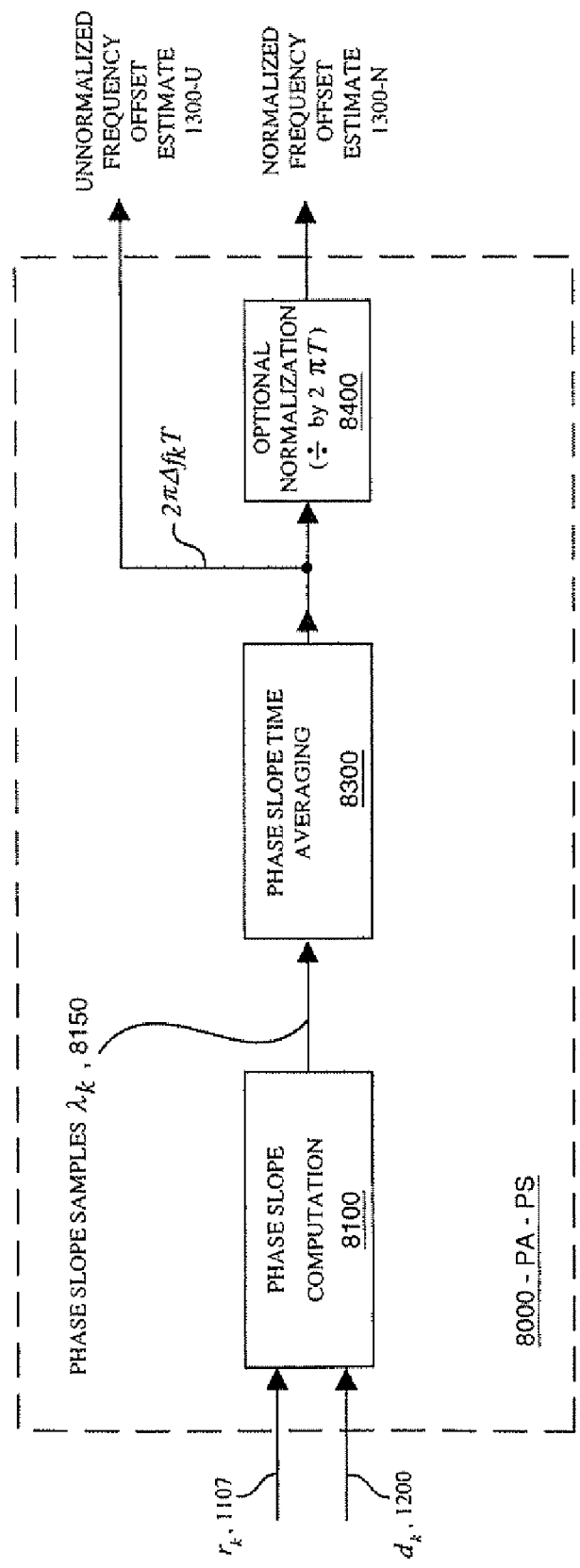
FIG. 2C provides detail of a prior art Frequency Offset Estimator 8000-PA-PS, based on Phase Slope Computation, and having application in the Demodulator 1000 of FIG. 2A.

Recall that in the presence of a single symbol error, the phase of $p_k$ for the prior art autocorrelation frequency estimator of FIG. 2B has a constant slope except for one discontinuity of $\pm\pi/2$ associated with the symbol error. Consequently, the phase of $\delta_k$ is centered around the desired value, except for L values with an error of $\pm\pi/2$. The present invention, illustrated in FIGS. 3-5, improves upon the prior art estimator by eliminating the secondary peak via appropriate non-linear filtering. More specifically, the aim of this filtering is to eliminate from the integration on $\delta_k$ the values known to be wrong. These values are those whose argument differs from that of the current average of $\delta_k$ by more than a certain angle v.

In preferred embodiments a preamble of 26 known symbols is used. Thanks to the preamble, it is possible to have a first coarse frequency estimate at the beginning of the data symbols. Using this value, it is possible to determine for each new $\delta_k$ whether it should be kept or not in the sum. If it is, this new value of the sum is used to filter the next symbols. Thus, if the coarse estimate provided by the preamble is precise enough, the secondary peaks are totally eradicated. Simulations of the illustrative embodiments have confirmed that the precision of the coarse frequency estimate provided by the preamble does support elimination of the secondary peaks. Those skilled in the art will appreciate that while the above description has focused on the elimination of atypical correlation samples for an autocorrelation frequency estimator, the invention is equally applicable to elimination of atypical phase slope samples for a phase slope computation frequency estimator.

Autocorrelation Embodiment

Figure 3:
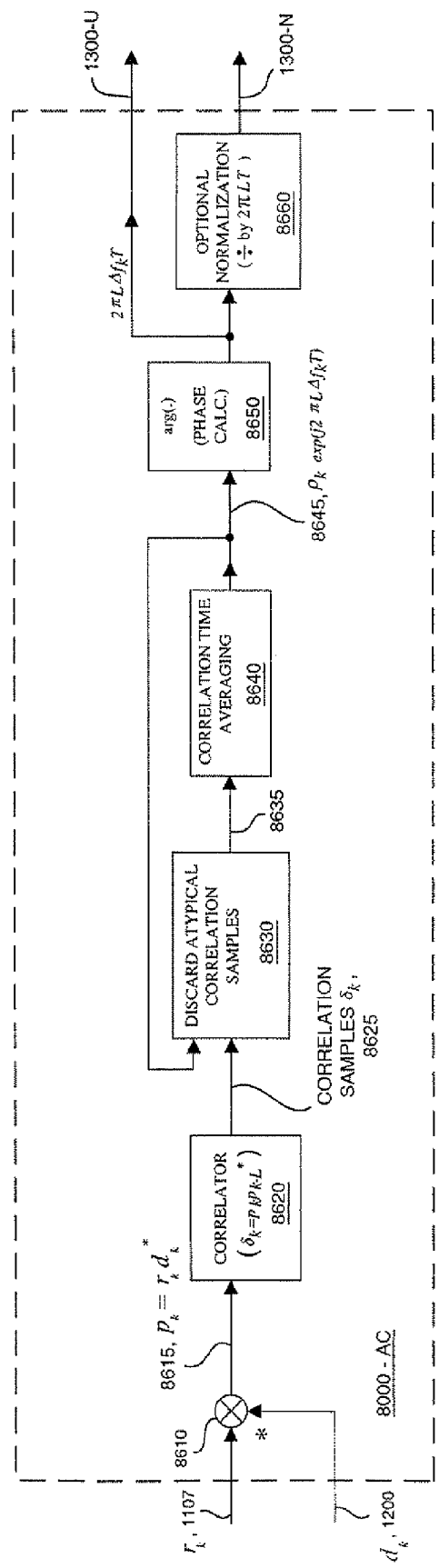
FIG. 3 provides detail of a first illustrative embodiment (8000-AC) of a Frequency Offset Estimator, based on Autocorrelation, in accordance with the present invention, and having application in the Demodulator of FIG. 2A.

FIG. 3 shows an Autocorrelation Frequency Estimator (8000-AC) in accordance with the present invention. As the name suggests, the frequency estimation algorithm is based on the computation of Correlation Samples $\delta_{k=p_k p_{k-L}^*}$ (8625), which are generated by Correlator 8620.

The discard atypical values and time averaging functions (8630 and 8640, respectively) operate on an exponential function involving the phase slope. At the output of the Correlation Time Averaging stage 8640, we have $\rho_k \exp(j2\pi L \Delta f_k T)$ 8645, where atypical values have been suppressed by Discard Atypical Correlation Samples 8630. Discard Atypical Correlation Samples 8630 acts such that $\delta_k$ has no effect on the running time average whenever the absolute value of $\arg[\delta_k \exp(-j2\pi L \Delta f_k T)]$ is greater than a fixed threshold v.

Arg(.) 8650 delivers the phase $2\pi L \Delta f_k T$, which is used as unnormalized frequency offset estimate 1300-U. Normalized frequency offset estimate 1300-N may optionally be provided as output.

Phase Slope Computation Embodiment

Figure 2D:
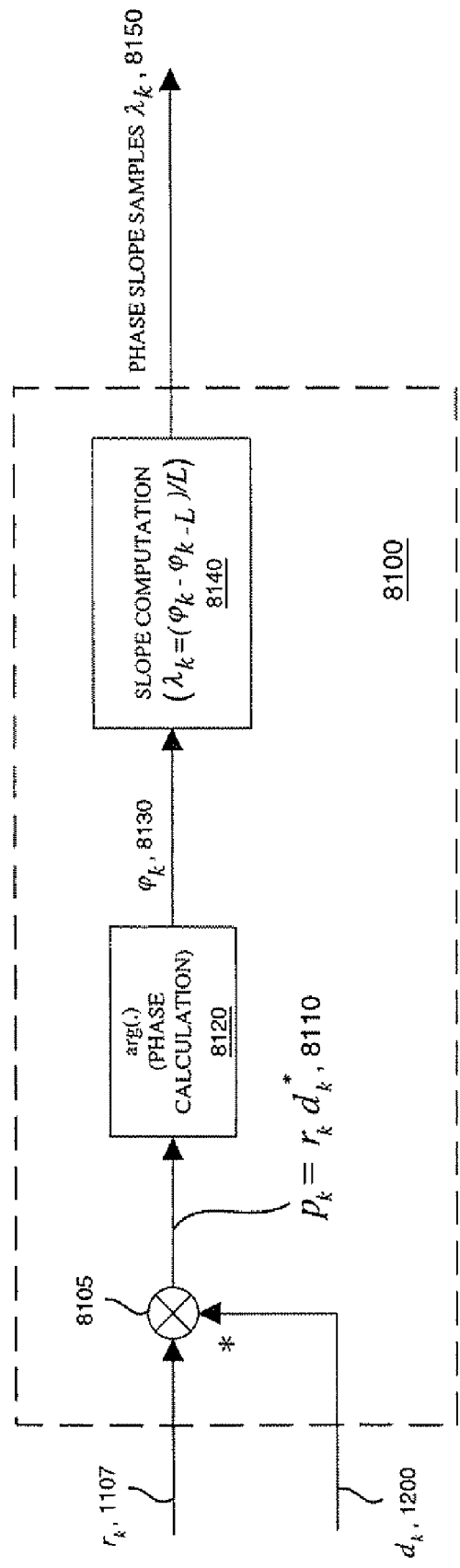
FIG. 2D provides additional detail of a prior art Phase Slope Computation Function 8100, as used in FIG. 2C.
Figure 4:
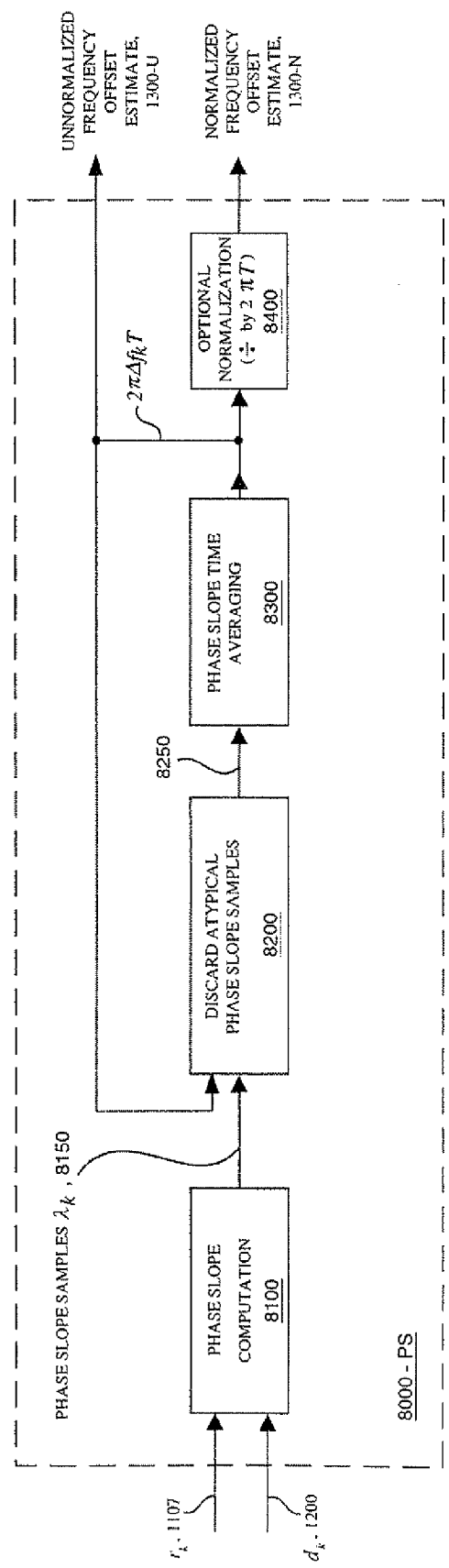
FIG. 4 provides detail of a second illustrative embodiment (8000-PS) of a Frequency Offset Estimator, based on Phase Slope Computation, in accordance with the present invention, and having application in the Demodulator of FIG. 2A.

FIGS. 4 shows a Phase Slope Computation Frequency Estimator (8000-PS) in accordance with the present invention. The Phase Slope Computation 8100 of FIG. 2D, is preferably used as the first stage of the improved Frequency Estimator (8000-PS) of FIG. 4. Within said Phase Slope Computation 8100, the received signal $r_k$ 1107 is multiplied (via 8105) by the complex conjugate of the detected symbol $d_k$ 1200. The function Arg(.) (i.e., the phase calculation function) 8120 gives the phase difference 8110 between the received and detected signals. Slope Computation 8140 computes the phase slope 8150 from two phase-values separated by L samples.

Phase Slope Time Averaging 8300 outputs an estimate of the frequency offset $2\pi\Delta f_k T$ (1300-U) using the phase slope values computed up to time k. This unnormalized frequency offset, or the normalized frequency offset estimate $\Delta f_k$ (1300-N), is updated at the symbol rate.

Discard Atypical Phase Slope Samples 8200 acts to discard the instantaneous phase slope values 8150 which differ from the current unnormalized frequency offset estimate $2\pi\Delta f_k T$ (1300-U) by more than a fixed threshold μ. If the difference between the two signals exceeds μ, then this circuit decides that a symbol error has occurred and that the current slope value should not be included in the time-averaging function. That is, $\lambda_k$ has no effect on the running time average whenever the absolute value of $2\pi\Delta f_k T - \lambda_k$ is greater than μ. Either the unnormalized frequency offset 1300-U or normalized frequency offset estimate 1300-N may be provided as output to the Control, MAC, Framing 2000 block of CMTS 500.

Atypical Samples Filter

Figure 5:
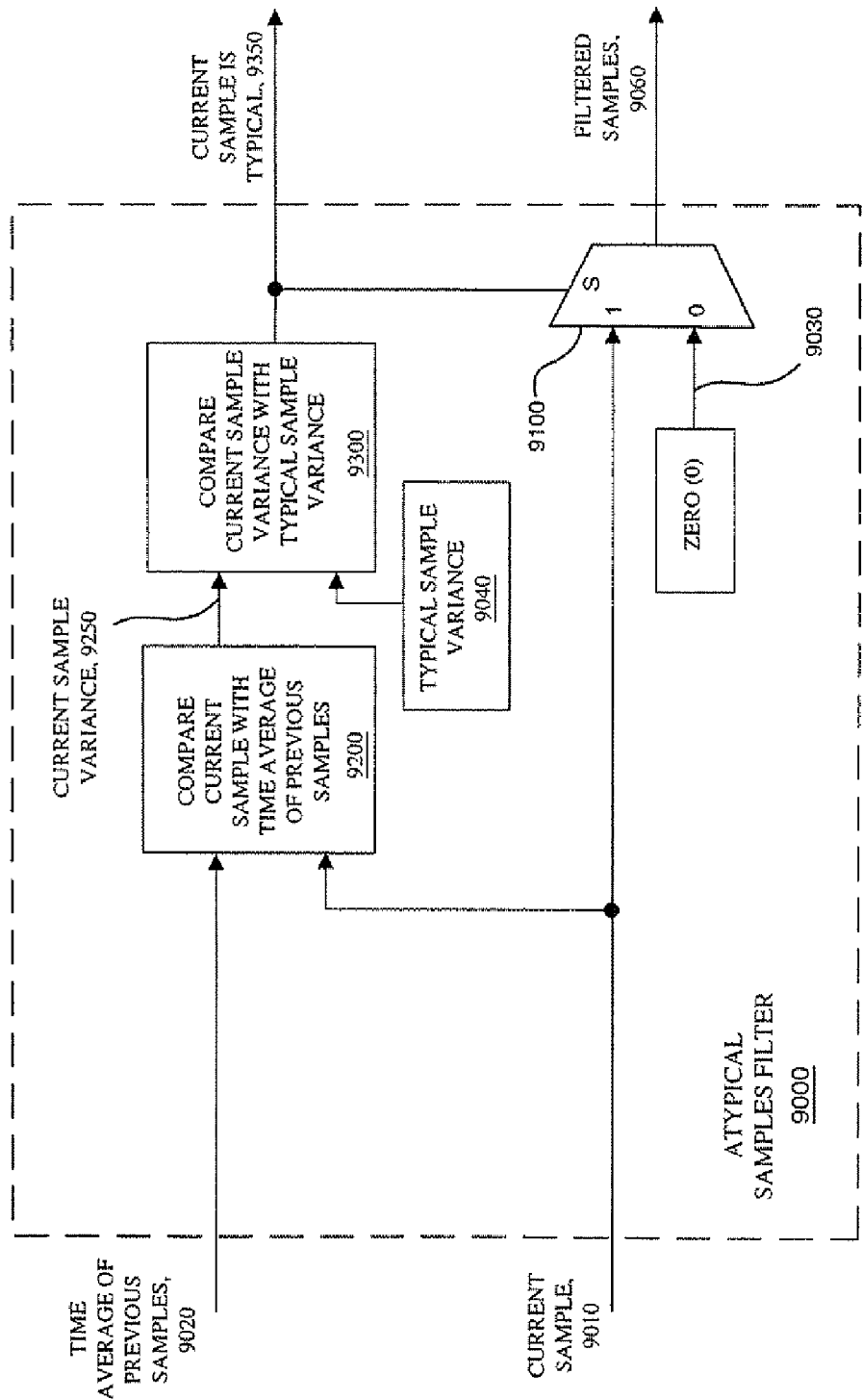
FIG. 5 provides detail of an illustrative embodiment of an Atypical Samples Filter 9000, suitable for application as either the Discard Atypical Correlation Samples Function 8630 of FIG. 3, or the Discard Atypical Phase Slope Samples Function 8200 of FIG. 4.

FIG. 5 provides detail of a conceptual illustrative embodiment of an Atypical Samples Filter 9000, suitable for application as either the Discard Atypical Correlation Samples Function 8630 of FIG. 3, or the Discard Atypical Phase Slope Samples Function 8200 of FIG. 4. This filter acts such that the current sample 9010 has no effect on the running time average of samples whenever the absolute value of the difference between the time average of samples 9020 and current sample 9010 is greater than the typical sample variance 9040. Block 9200 compares Current Sample 9010 with Time Average Of Samples 9020 to generate Current Sample Variance 9250. This in turn is compared against predefined Typical Sample Variance 9040 to produce Current Sample is Typical 9350, a logical binary valued control output. This control can be used directly by a subsequent time averaging circuit to qualify/suppress the use of the current sample. Alternatively, or in combination with direct use, this control can be used to zero the Filter Sample value 9060 provided to the time averaging circuit.

Implementation Considerations

In comparing the two illustrative embodiments, the phase function on which the phase slope based estimator of FIG. 4 operates is a "wrapped" function that is periodic between $-\pi$ and $+\pi$. The significance of this is that boundary tests and conditional calculations must be performed to "unwrap" this function prior to the computation of the phase slope and thereby the frequency offset. The correlation-based estimator of FIG. 3 has no need to perform the extra phase unwrapping operations, and thus may offer implementation advantages.

Figure 1A:
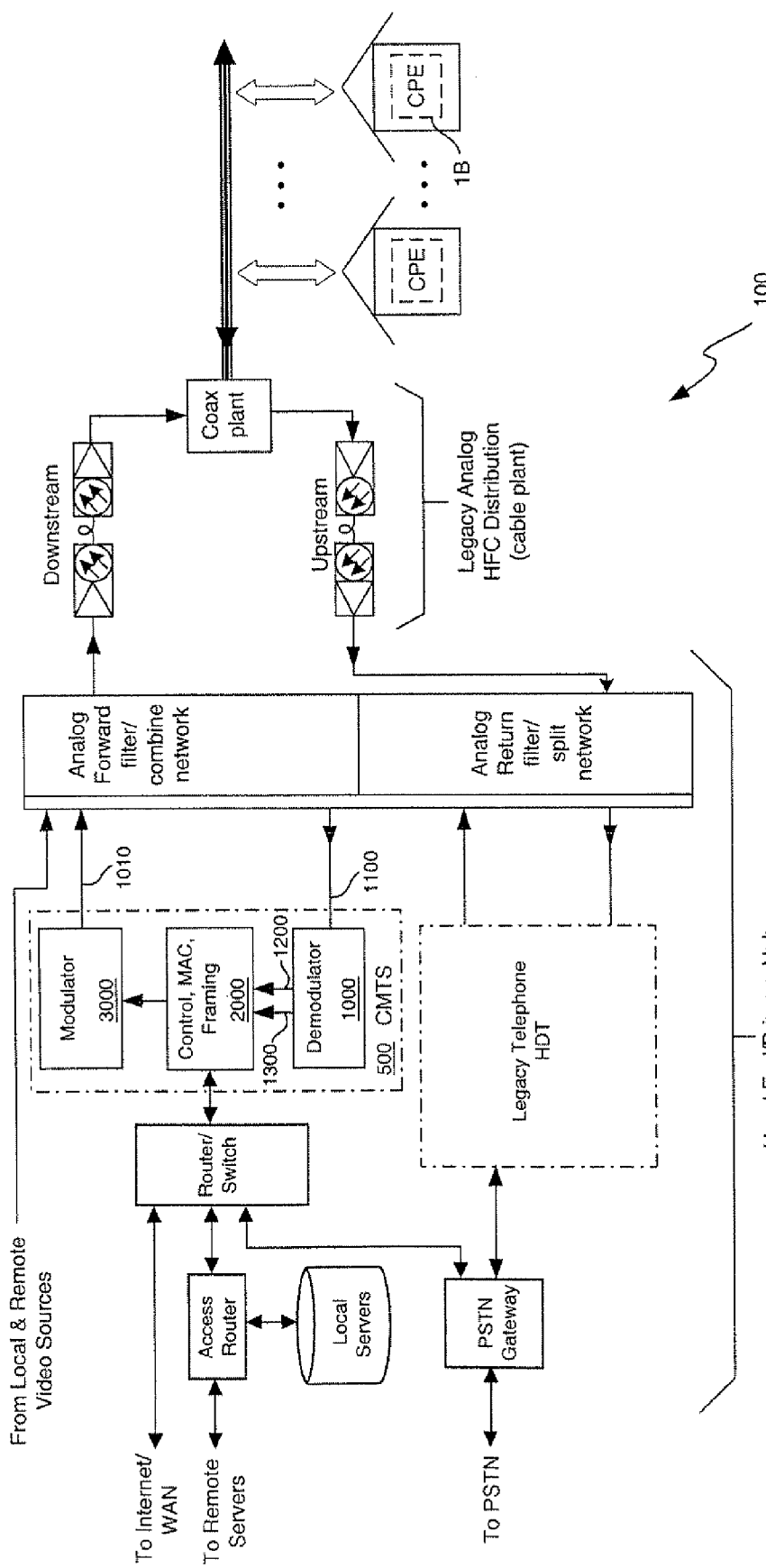
FIGS. 1A and 1B illustrate a prior-art HFC cable system.
Figure 1B:
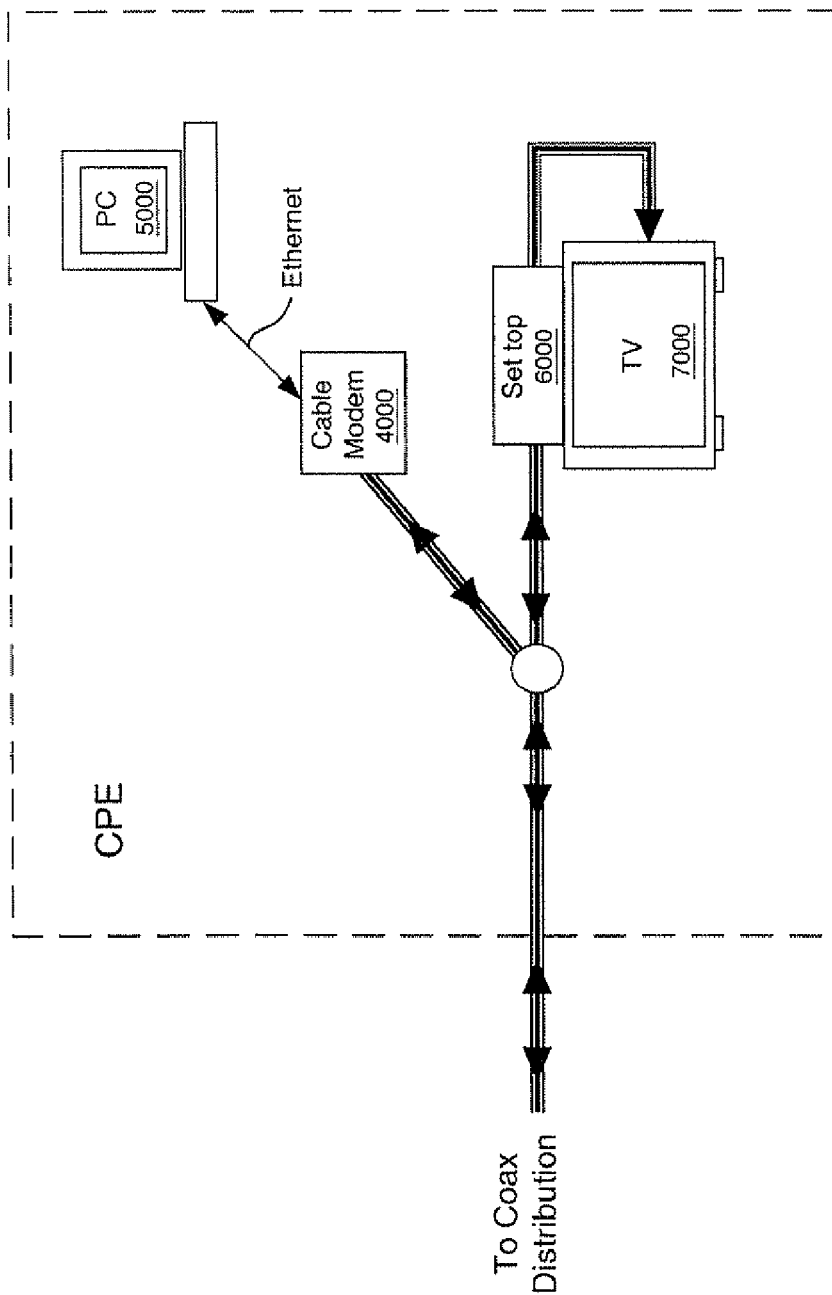

In considering the implementation boundary between hardware (H/W) and software (S/W), remember that the Demodulator 1000 of FIG. 1A does not use the frequency estimation result. Instead it is sent by the CMTS to the CM as an offset-frequency-adjust to control the CM transmit-frequency. This is not a real time procedure, and only one offset frequency adjust is to be sent per burst. However, the frequency error estimate is extracted from a real-time sampled signal with one sample per symbol. In our preferred implementation, all functions are implemented in hardware except the phase calculation in box 8650 and optional normalization in box 8660 of FIG. 3, and the optional normalization in box 8400 in FIG. 4. The reason is that those computations are performed once per burst, which means that they do not need high-speed electronics.

A fully software implementation would consist of sending the equalized samples $r_k$ and detected symbols $d_k$ to the software and make all computations in software. While such an implementation is within the scope of the present invention, it is not likely to be an efficient implementation. In general, real-time computations (at the symbol rate) are best made in hardware and low-speed computations (at the burst rate) are best made in software.

CONCLUSION

Although the present invention has been described using particular illustrative embodiments, it will be understood that many variations in construction, arrangement and use are possible consistent with the teachings and within the scope of the invention. For example, bit-widths, clock speeds, and the type of technology used may generally be varied in each component block of the invention. Also, unless specifically stated to the contrary, the value ranges specified, the maximum and minimum values used, or other particular specifications (such as the desired accuracy of the frequency estimate), are merely those of the illustrative or preferred embodiments, can be expected to track improvements and changes in implementation technology, and should not be construed as limitations of the invention. Functionally equivalent techniques known to those skilled in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

Specific variations within the scope of the invention include, but are not limited to: the use of any of a variety of techniques for identifying atypical samples and for suppressing their impact on sample averages, the use of any of a variety of preamble lengths and not just via the preferred length of 26 symbols, and the use of either or both of the unnormalized and normalized frequency offset.

All such variations in design comprise insubstantial changes over the teachings conveyed by the illustrative embodiments. The names given to interconnect and logic are illustrative, and should not be construed as limiting the invention. It is also understood that the invention has broad applicability to other communications and network applications, and is not limited to the particular application or industry of the illustrated embodiments. The present invention is thus to be construed as including all possible modifications and variations encompassed within the scope of the appended claims.

I claim:

1. A device for estimating the frequency offset between a transmitter and a receiver, comprising:
   a first stage configured to generate first processed samples based on received pre-detection samples and detected symbols;
   a second stage configured to receive the first processed samples and remove atypical samples from the processed samples to generate filtered samples; and
   a third stage configured to:
   receive the filtered samples,
   estimate a time average of the filtered samples, and
   provide the time average of the filtered samples to the second stage.

2. The device of claim 1, wherein the second stage is further configured to substitute zero value samples for the removed atypical samples.

3. The device of claim 1, wherein the second stage is further configured to identify a current sample variance and a typical sample variance; and
   wherein the second stage is further configured to determine that a current sample is an atypical sample based on a difference between the current sample variance and the typical sample variance.

4. The device of claim 3, wherein the second stage is further configured to determine that a current sample is an atypical sample when it is determined that the absolute value of the current sample variance is greater than the typical sample variance.

5. The device of claim 1,
   wherein the first stage is further configured to perform a correlation and wherein the first processed samples comprise correlation samples.

6. The device of claim 5, further comprising:
   a fourth stage configured to receive the time average of the filtered samples and generate an unnormalized frequency offset indication.

7. The device of claim 5, further comprising:
   a fifth stage configured to receive the unnormalized frequency offset indication and generate an normalized frequency offset indication.

8. The device of claim 1, wherein the first stage is further configured to perform a phase slope computation and the first processed samples comprise phase slope samples.

9. The device of claim 8, wherein the phase slope computation includes a phase calculation sub-stage and a slope computation sub-stage.

10. A method of estimating a frequency offset between a transmitter and a receiver, comprising:
    receiving a signal including pre-detection symbols and detected symbols;
    generating first processed samples based on the received pre-detection symbols and the detected symbols;
    filtering the first processed samples to remove atypical samples and output filtered samples; and
    identifying a time average and a first frequency offset estimate based on the filtered samples.

11. The method of claim 10, further comprising:
    identifying a typical sample variance based on the filtered samples;
    identifying a current sample variance based on a current sample; and
    identifying atypical samples based on differences between the current sample variance and the typical sample variance.

12. The method of claim 11, further comprising:
    identifying the current sample as an atypical sample when an absolute value of the current sample variance is greater than the typical sample variance.

13. The method of claim 10, wherein the filtering the first processed samples is not performed during a part of a preamble portion of the received signal.

14. The method of claim 10, wherein the filtering the first processed samples is not performed during an entire preamble portion of the received signal.

15. The method of claim 13, wherein the preamble portion includes 26 known symbols.

16. The method of claim 10, wherein the generating first processed samples further comprises:
    correlating the pre-detection samples and the detected samples to generate correlation samples.

17. The method of claim 10, wherein the generating first processed samples further comprises:
   calculating a phase slope of the pre-detection samples and the detected samples to generate phase slope samples.

18. A computer-readable medium including one or more instructions for estimating a frequency offset between a transmitter and a receiver, comprising:
   one or more instructions for receiving a signal including pre-detection symbols and detected symbols;
   one or more instructions for generating first processed samples based on the received pre-detection symbols and the detected symbols;
   one or more instructions for filtering the first processed samples to remove atypical samples and output filtered samples; and
   one or more instructions for identifying a time average and a first frequency offset estimate based on the filtered samples.

19. The computer-readable medium of claim 18, further comprising:
   one or more instructions for identifying a typical sample variance based on the filtered samples;
   one or more instructions for identifying a current sample variance based on a current sample; and
   one or more instructions for identifying atypical samples based on differences between the current sample variance and the typical sample variance.

* * * * *